United States Patent Office

3,517,484
Patented June 30, 1970

3,517,484
SELECTIVE ADSORPTION PROCESS
Max Nai Yuen Lee, Buffalo, N.Y., and Richard Joseph Schoofs, Moraga, Calif., assignors to Union Carbide Corporation, a corporation of New York
No Drawing. Filed Mar. 13, 1968, Ser. No. 712,581
Int. Cl. B01d 53/02
U.S. Cl. 55—73       2 Claims

ABSTRACT OF THE DISCLOSURE

The removal of acidic components from gas streams containing same by selective adsorption on a zeolitic molecular sieve bed is vastly improved by adding to the gas stream, prior to entering the zeolite bed, a controlled quantity of ammonia.

---

This invention relates to a process for selectively coadsorbing on a zeolitic molecular sieve bed ammonia and an acidic gas component from a gas stream containing said acidic component, the ammonia content of the gas stream having been at least in part supplied from an external source.

The class of crystalline zeolites now well known as zeolitic molecular sieves exhibit adsorptive properties useful in separating one or more components from fluid mixtures. By selecting the appropriate molecular sieve with respect to the composition of the fluid mixture concerned, it is possible to preferentially or selectively adsorb and thus reduce the concentration of, or completely remove a constituent of, the fluid mixture. It is the general understanding of those skilled in the art that the selectivity or preference of a zeolitic molecular sieve is based on a number of factors which include the molecular size of the fluid components with respect to the effective diameter of the uniform pores of the zeolite and also the polar nature of the molecules to be adsorbed.

For any particular molecular sieve zeolite, it is also known that the adsorptive capacity and selectivity for a given adsorbate can to some degree be modified by altering the type of cation normally present in the zeolite structure, such cations being those which electrovalently balance the $AlO_4$ tetrahedra which in conjunction with $SiO_4$ tetrahedra form the basic three-dimensional framework of the zeolite crystal. In the case of the synthetically prepared molecular sieve now widely identified as zeolite A (U.S. Pat. No. 2,882,243), for example, the form in which the cations are sodium has pore diameters of about 4 angstrom units, whereas the form produced by exchanging the sodium ions for potassium or calcium cations exhibit pore diameters of about 3 angstrom units and 5 angstrom units, respectively.

In many instances a given zeolitic molecular sieve exhibits a marked preference for one molecular species of a molecular mixture, but does not entirely exclude one or more other molecular species which are present. In such circumstance it has been formerly proposed to alter the adsorptive characteristics of the zeolite by pre-introducing into the dehydrated molecular sieve a quantity of a non-aqueous or dehydrated polar adsorbate such as ammonia or an ammonia derivative such as methylamine. The modification effected thereby is disclosed in U.S. Pat. No. 2,930,447, as resulting in a general decrease in the adsorptive capacity for all molecules which are capable of passing through the zeolite pores, but also a disproportionate decrease for certain molecules so that relatively the adsorptive capacity for certain other molecules may be viewed as being enhanced.

In the purification of gas streams used in commercial processes particular problems have been encountered in the removal of acidic components which are usually, but not necessarily, present in relatively small concentrations, but which are extremely poisonous toward catalyst compositions, or if vented to the atmosphere, cause serious air pollution detrimental to animal and/or plant life.

To a degree these problems have been solved by resorting to adsorbent beds of zeolitic molecular sieve to adsorb and isolate the undesirable component. In fact, properly chosen zeolitic molecular sieve adsorbents have been demonstrated to be capable of effectively removing essentially 100% of acidic impurities from gas streams even when these impurities are present in only trace amounts, i.e., very few parts per million by volume. Unfortunately, however, molecular sieves in general have a relatively small capacity for most of these compounds, and in many applications very large molecular sieve beds have been required. Where smaller beds have been used, it has been necessary to interrupt frequently the adsorption process and regenerate the molecular sieve.

It is accordingly the general object of the present invention to improve the efficiency of any zeolitic molecular sieve adsorbent bed with respect to acidic compound removal from gas streams by increasing the sorptive capacity of the zeolite for the said acidic compounds.

In the accomplishment of the aforesaid object it has surprisingly been found that the deliberate addition of a controlled amount of ammonia as an impurity to a gas stream already contain acidic gas impurities, or in certain circumstances supplementing any inadequate amount of ammonia which might already be present, followed by contacting the stream with a zeolitic molecular sieve adsorbent bed results in a vastly greater adsorption of one or more of the undesirable acidic gas components without involuntarily contaminating the effluent from the adsorption bed with ammonia.

The gas streams suitably treated in accordance with the present process are those which contain as acidic impurities at least one or a mixture of two or more of $CO_2$, COS, $SO_2$, $H_2S$, $CS_2$, $NO_2$ and alkyl thiols of the formula RSH in which the alkyl radical R contains from 1 to 5 carbon atoms. One or more of these compounds, all of which exhibit an acidic character toward ammonia, are common impurities in gas streams employed in petroleum hydrocarbon alkylation, cracking, the preparation of liquefied petroleum gas, ammonia synthesis, air liquefaction and fractionation, natural gas liquefaction and the like and hence the gas streams containing the aforesaid acidic gas impurities contain at least one or a mixture of two or more of nitrogen, hydrogen and alkanes and alkenes containing from 1 to 6 carbon atoms.

The crystalline structure and chemical composition of the molecular sieves useful in this invention is not a critical factor provided only that it possesses pores sufficiently large to adsorb ammonia and at least one of the acidic gas impurities present, i.e., will not exclude ammonia and the acidic gas impurities sought to be removed by adsorption. Although the pore size of a given zeolite is subject to minor variation with respect to certain factors such as temperature and the maximum dimension of the minimum projected cross-section of a molecule is similarly affected by the energy state of the molecule, it will suffice herein to regard as necessary that the zeolitic molecular sieve have a pore diameter of at least about 3 angstrom units.

Illustrative of the molecular sieve zeolite advantageously employed in the practice of this invention are zeolite A (U.S. Pat. No. 2,882,243) especially the sodium or calcium form; zeolite X (U.S. Pat. No. 2,882,244); zeolite Y (U.S. Pat. No. 3,130,007); zeolite L (U.S. Pat. No. 3,216,-789); zeolite W (U.S. Pat. No. 3,012,853); zeolite T (U.S. Pat. No. 2,950,952); zeolite R (U.S. Pat. No. 3,030,181);

zeolite F (U.S. Pat. No. 3,011,869); zeolite S (U.S. Pat. No. 3,054,657). The patents listed in conjunction with the zeolite designations disclose in detail the composition and method of preparation of the foregoing synthetic zeolites. It will be understood that the pore diameters of zeolites can vary depending upon the nature of the cations present in the crystal structure. In some instances, for example, zeolite A, when the sodium cations present in the as-prepared form are exchanged for more than 50 percent of potassium cations, the effective pore size is decreased to a degree sufficient to partially restrict the adsorption of an acid gas such as $CO_2$. Calcium cation exchange of zeolite A to the same degree, however, results in an enlargement of the effective pore size beyond that of the sodium cation form of the zeolite. Accordingly, it is not only necessary to select a given zeolite for the present process, but also consideration should be given the particular cation form employed.

In the instance wherein methyl or ethyl mercaptan is an impurity to be adsorbed, it is a requirement that the pore size of a suitable molecular sieve adsorbent should be at least about 4 angstroms although most of the acidic impurities may be adsorbed by a molecular sieve having a pore size of at least 3 angstroms. The larger pores may prove beneficial in permitting faster rates of adsorption. Furthermore, the branched chain isomers of the larger alkyl mercaptans would require that the adsorbent have pores larger than about 6 angstroms in effective diameter. Natural zeolites such as chabazite, erionite, mordenite, clinoptilolite and faujasite are also suitably utilized. Other zeolites which are not of the three-dimensional crystalline molecular sieve type, as for example, the permutits commonly used as water softeners are not suitable.

The addition of ammonia to the gas stream carrying the acidic gas impurities is preferably done just prior to the point at which the stream enters the molecular sieve adsorbent bed. It is further advantageous to obtain good mixing of the ammonia with the gas stream. In this regard conventional metering apparatus is adequate, particularly a metering system which is capable of adjusting the quantity of ammonia injected in accordance with fluctuations in the concentration of the acidic gas impurities in the carrying gas stream.

The quantity of ammonia injected is to some degree dependent upon the quantity of acidic gas impurity present, and in general the ammonia should constitute at least 0.05 of the partial pressure of the impurity gas. A large excess of ammonia beyond that required to accomplish complete removal by adsorption of all acidic gas impurity is not harmful, except more frequent adsorbent bed regeneration will be necessary, but practically speaking, an upper limit of ammonia addition to the gas stream is an ammonia concentration of 2.5 volume percent.

The temperature and pressure operating conditions of the adsorbent bed are not narrowly critical. Satisfactory results are readily attained at temperatures from —50° F. to 250° F. and pressures of about atmospheric to 2000 p.s.i.a.

Regeneration of the adsorbent bed to remove ammonia and the impurity gases is accomplished by conventional means. A purge with an inert gas such as nitrogen or hydrogen at temperatures 50° C. or more, higher than the temperature at which adsorption was carried out and up to 800° F. is a satisfactory regeneration technique. Pressure reduction, with or without the addition of heat is also suitable and may be at subatmospheric pressure if desired.

The invention is further illustrated by reference to the following examples:

EXAMPLE 1

A series of adsorption beds were prepared using activated samples of zeolitic molecular sieves in pellet form. The beds were incorporated into a system whereby a 1:2 nitrogen:hydrogen stream containing $CO_2$ as an acid gas impurity could be fed to the bed and the effluent stream from the bed monitored with respect to the $CO_2$ concentration. Provision was also made for introducing ammonia into the feed stream in predetermined concentrations. The operating conditions and the results as shown in tabular form below:

TABLE I

|  | Sodium Zeolite X |  | Sodium Zeolite A |  |
|---|---|---|---|---|
| Temperature, °F | 50 | 63 | 52 | 50 |
| Pressure, p.s.i.a | 413 | 418 | 420 | 415 |
| Flow rate, s.c.f.m | 20.4 | 21.2 | 25.5 | 20.4 |
| Feed gas contaminants: |  |  |  |  |
| $H_2O$, p.p.m. by vol | 0 | 280 | 280 | 280 |
| $CO_2$, p.p.m. by vol | 9.5 | 9.8 | 10.8 | 10.1 |
| $NH_3$, p.p.m. by vol | 0 | 9.7 | 2.9 | 10.0 |
| MS bed weight: |  |  |  |  |
| Lb | 1.36 | 1.57 | 2.70 | 2.19 |
| Diameter, in | 1.93 | 1.93 | 2.07 | 1.93 |
| Length, in | 20.8 | 23.8 | 30.8 | 29.9 |
| Time to 0.1 p.p.m. $CO_2$ in effluent, hrs | 4.1 | 6.0 | 5.6 | 7.2 |

EXAMPLE 2

Using essentially the same procedure and apparatus as in Example 1, equally activated sodium zeolite X pellets were placed in an adsorbed bed and contacted with a nitrogen gas stream containing carbonyl sulfide. Into one stream there was injected, prior to bed contact, dry ammonia gas. The results and other pertinent data are shown in tabular form below:

TABLE 2

| Run | 1 | 2 |
|---|---|---|
| Temperature, °C | 24 | 24 |
| Pressure, p.s.i.g | 50 | 50 |
| Flow rate, s.c.f.h | ~300 | ~300 |
| COS, feed concentration, p.p.m., vol | 275–325 | 275–325 |
| $NH_3$ feed concentration, p.p.m., vol | 0 | 1400 |
| Feed weight, lbs. m.s | 1.69 | 1.68 |
| Time to 3 p.p.m. COS in effluent, min | 205 | 660 |

EXAMPLE 3

Two adsorbent beds of equal quantities of equally activated zeolite Y pellets having a silica-to-alumina ratio of 4.5 are contacted with air streams containing 20 p.p.m. by volume each of $SO_2$ and $NO_2$ as impurities. Into one of the gas streams is injected, prior to contact with the adsorbent bed, sufficient ammonia gas such that ammonia is present in an amount of 400 parts per million by volume. The adsorbent beds and the gas streams are each at ambient room temperature of about 24° C. and the pressure of the gas is 3 atmospheres. Using identical feed rates of 28 s.c.f.m. it is found that breakthrough with respect to the impurity constituents is more than 50 percent longer in time in the instance of the test with ammonia added as in the other.

EXAMPLE 4

Two adsorbent beds of equally activated zeolite L are connected with methane streams containing 15 p.p.m. each of $H_2S$, $CS_2$ and methyl mercaptan as impurities. Into one of the streams is injected, prior to contact with the adsorbent bed, sufficient ammonia gas such that ammonia is present in an amount of 500 parts per million by volume. The adsorbent beds and gas streams are each at ambient room temperature of about 24° C. and the pressure of the gas is 60 p.s.i.g. Using identical feed rates, it is found that the time to breakthrough with respect to the impurity constituents is more than 50 percent longer in the instance of the test with ammonia.

What is claimed is:

1. In the process for removing from a fluid stream at least one impurity contained therein selected from the group consisting of COS, $CS_2$, $H_2S$, $NO_2$ and alkyl mercaptans containing from 1 to 5 carbon atoms, by selective adsorption of said impurity on a zeolitic molecular sieve, the improvement which comprises injecting into said fluid stream, prior to contacting same with a zeolitic molecular sieve bed, a quantity of ammonia such that the ammonia exerts in said fluid stream a partial pressure of at least 0.05 of the partial pressure of the impurity and is not more than 2.5 volume percent of the fluid stream.

2. The process according to claim 1 wherein the fluid stream containing the impurity contains at least one member selected from the group consisting of $H_2$, $N_2$, an alkane containing from 1 to 6 carbon atoms and an alkene containing from 1 to 6 carbon atoms.

References Cited

UNITED STATES PATENTS 2,992,703    7/1961    Vasan et al. _____ 55—75 X

JAMES L. DeCESARE, Primary Examiner

U.S. Cl. X.R.

55—75